United States Patent [19]

Ament et al.

[11] Patent Number: 5,676,415
[45] Date of Patent: Oct. 14, 1997

[54] LUGGAGE COMPARTMENT COVER FOR A MOTOR VEHICLE

[75] Inventors: Eduard Ament, Aichwald; Holger Seel, Aidlingen, both of Germany

[73] Assignee: Baumeister + Ostler GmbH & Co. KG, Germany

[21] Appl. No.: 559,882

[22] Filed: Nov. 20, 1995

[30] Foreign Application Priority Data

Nov. 19, 1994 [DE] Germany ............... 44 41 260.6
Aug. 1, 1995 [EP] European Pat. Off. ......... 95112047

[51] Int. Cl.$^6$ .................................................. B60R 5/04
[52] U.S. Cl. ................. 296/37.16; 160/238; 160/323.1; 160/903; 248/268
[58] Field of Search ............................. 296/37.16, 98; 160/238, 250, 263, 24, 323.1, 903; 248/268

[56] References Cited

U.S. PATENT DOCUMENTS

| 823,452 | 6/1906 | Vickery | 248/268 |
|---|---|---|---|
| 2,307,095 | 1/1943 | Zaferakis | 160/263 |
| 4,222,601 | 9/1980 | White et al. | 296/37.16 |
| 4,668,001 | 5/1987 | Okumura et al. | 296/37.16 |
| 4,671,557 | 6/1987 | Lemp | 296/37.16 |
| 5,584,523 | 12/1996 | Kawaguchi | 296/37.16 |

FOREIGN PATENT DOCUMENTS

| 726494 | 1/1966 | Canada | 160/263 |
|---|---|---|---|
| 29 41 711 | 4/1980 | Germany . | |
| 39 22 450 | 1/1991 | Germany . | |
| 40 13 157 | 7/1991 | Germany . | |
| 524397 | 1/1993 | WIPO | 296/37.16 |

*Primary Examiner*—David M. Mitchell
*Assistant Examiner*—Hoa B. Trinh
*Attorney, Agent, or Firm*—Evenson, McKeown, Edwards & Lenahan P.L.L.C.

[57] ABSTRACT

A luggage compartment cover for a motor vehicle has a bearing shaft extending between two bucket-shaped side parts, which supports a flat structure that can be rolled and unrolled, such as a concealing cover. At least one of the side parts is axially movable with respect to a bearing axis of the bearing shaft between a release position, in which the side part is released from a mount which is integral with the vehicle, and a locking position, in which the side part is locked in the mount which is integral with the vehicle. At least one side part has a releasable lock for locking the side part in the release position. In another embodiment, the luggage compartment cover has a locking device which locks a side part axially relative to the bearing shaft and which is unlockable with an actuating button. In another embodiment, the luggage compartment cover has a releasable lock which is constructed in the manner of a ballpoint pen lock.

13 Claims, 6 Drawing Sheets

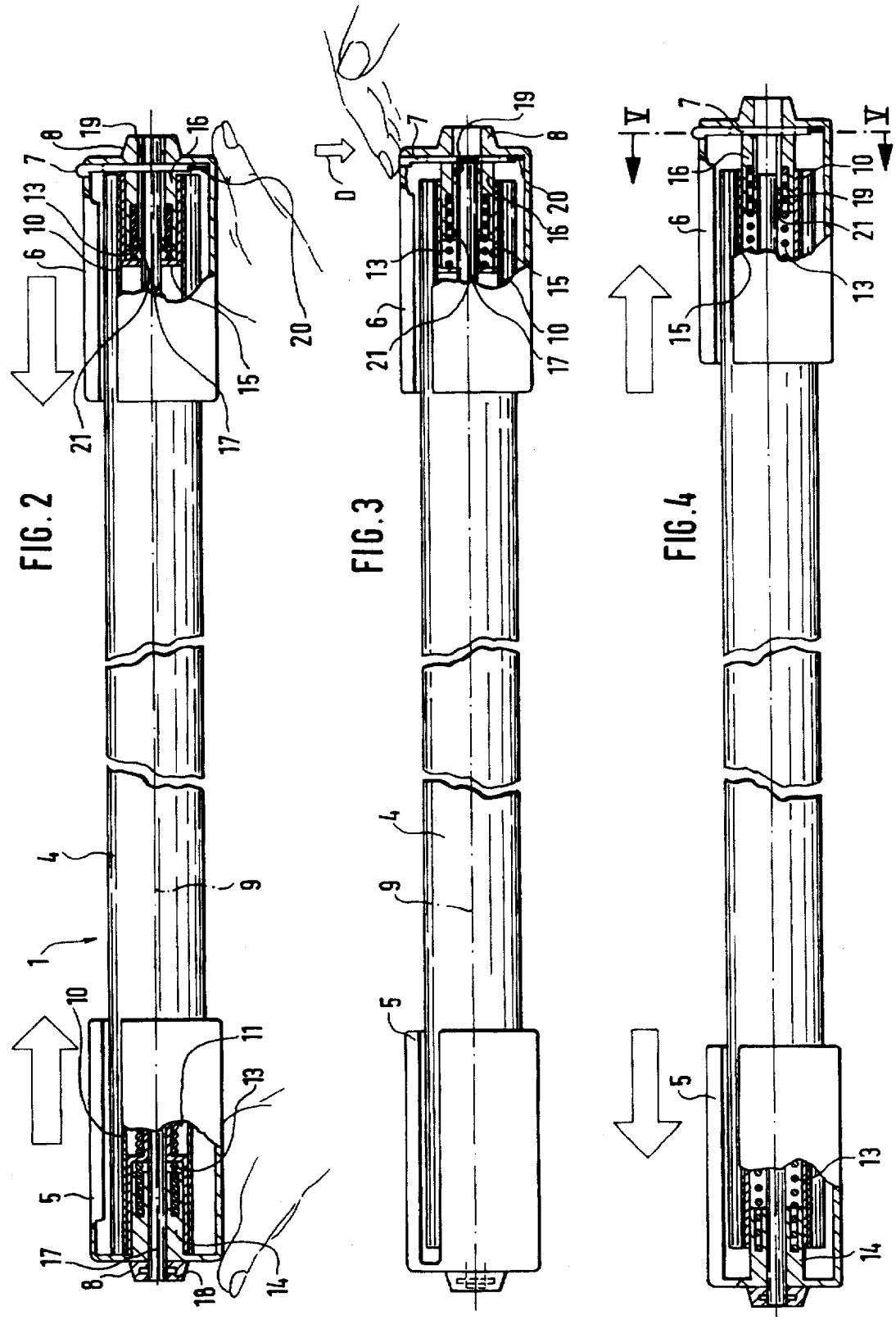

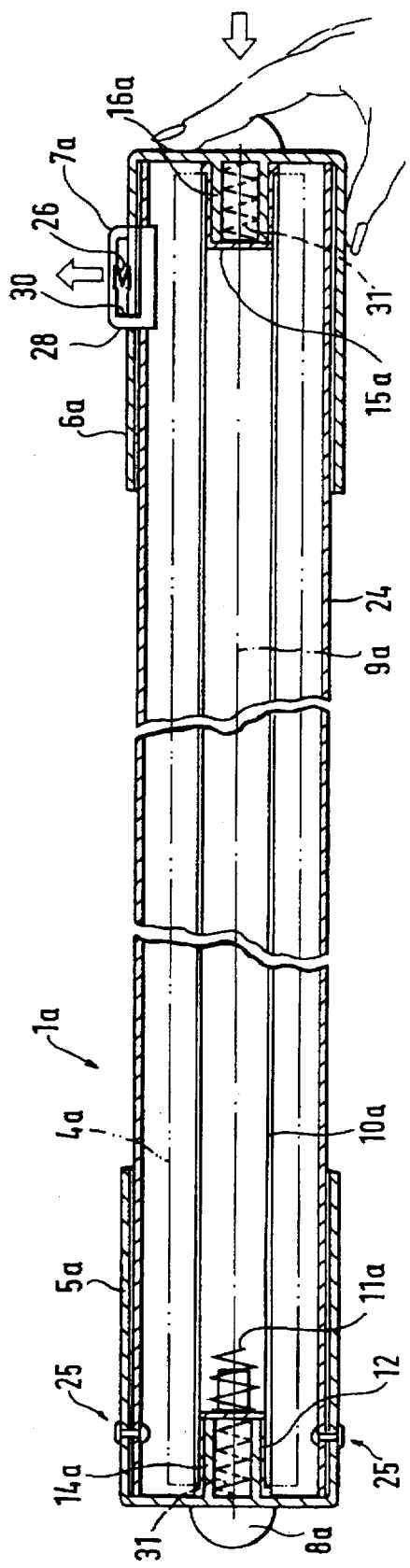
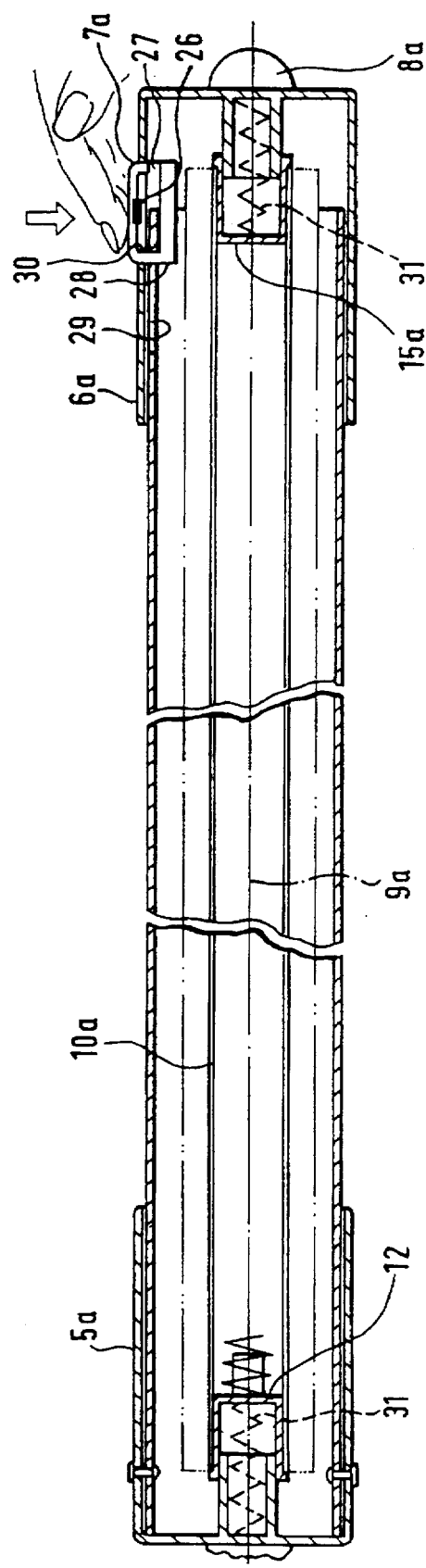
FIG.8
FIG.9

LUGGAGE COMPARTMENT COVER FOR A MOTOR VEHICLE

BACKGROUND AND SUMMARY OF THE INVENTION

This invention relates to a luggage compartment cover for a motor vehicle, and more particularly to a luggage compartment cover with a bearing shaft extending between two bucket-shaped side parts, for a flat structure that can be rolled and unrolled, especially a concealing cover, with at least one of the two side parts being movably disposed under spring tension coaxially with respect to one bearing axis of the bearing shaft between two position stops, said stops defining firstly a release position that releases the cover from the mounts that are integral with the vehicle and secondly a locking position that locks the cover in the mounts integral with the vehicle.

A luggage compartment cover for an automobile is known from German patent document DE 29 41 711A in which a concealing cover is rolled up on a shaft mounted between two bucket-shaped side parts. The two side parts are compressible axially inward in telescoping fashion against an axial spring load, causing the width of the luggage compartment cover to be reduced. This axial mobility of the side parts serves to secure the luggage compartment cover in holders integral with the vehicle or to remove them therefrom. To place the luggage compartment cover in the mounts integral with the vehicle, especially in the vicinity of the luggage compartment of the automobile, the luggage compartment cover is gripped with both hands in the vicinity of the two side parts. Then the two side parts are pressed axially inward by expending manual force against a spring force, i.e. the forces applicable by hand are opposed to one another. This reduces the width of the luggage compartment cover, so that the side parts with corresponding locking positions can be inserted into corresponding locking positions of the mounts integral with the vehicle in the vicinity of the side walls of the luggage compartment. As soon as the luggage compartment cover is so positioned that the respective corresponding locking positions are flush with one another, the axial force applied by hand to the side parts is removed, so that the spring located inside the luggage compartment cover presses the side parts outward. This jams the luggage compartment cover between the side walls of the luggage compartment and is additionally held positively in this position by the corresponding locking positions. To remove the luggage compartment cover from the luggage compartment, the side parts are again pushed together by hand so that the luggage compartment cover can be removed from the mounts integral with the vehicle.

An object of the invention is to provide a luggage compartment cover which permits simplified handling during installation and removal of the luggage compartment cover.

These and other objects are achieved according to the present invention by providing a luggage compartment cover for a motor vehicle having a bearing shaft extending between two bucket-shaped side parts for a flat structure that can be rolled and unrolled, at least one of the two side parts being mounted under spring tension and being movable coaxially with respect to a bearing axis of the bearing shaft between a first position stop and a second position stop, said first position stop defining a release position in which said at least one of the two side parts is released from a mount which is integral with the vehicle, and said second position stop defining a locking position in which said at least one of the two side parts is locked in said mount which is integral with the vehicle, wherein at least one side part has a manually releasable lock for locking said at least one side part in said first position stop which defines the release position.

By locking at least one side part and hence the luggage compartment cover in the release position, no axial force need be exerted by hand in order to hold the luggage compartment cover in its release position when lining it up with the mounts that are integral with the vehicle. This considerably simplifies handling of the luggage compartment cover. The luggage compartment cover need only be brought into its release position in which the lock is effective. Then the luggage compartment cover can be positioned exactly at the level of the mounts integral with the vehicle. Then, by releasing the lock by hand, the side parts are pressed automatically, particularly by compression spring forces acting axially, into the mounts integral with the vehicle.

Removal of the luggage compartment cover is accomplished in simple fashion by pressing the two side parts together, so that the (at least one) side part is held by means of the lock when it reaches the release position. In this position in which the luggage compartment cover has a width which is reduced in the locking position, it can easily be removed from the luggage compartment without exerting force. Both those locks which operate by friction as well as those that are positively active are provided. According to advantageous embodiments of the invention it is possible for only one of the two side parts to be movable axially inward and lockable in this position, or for both side parts each to be provided with a lock of its own. According to the invention, the flat structures may be concealing covers, concealing shades, or luggage nets. If a luggage net is provided as a cover it is also contemplated that the luggage compartment cover does not serve, as in most cases, for covering the luggage compartment horizontally, but is pulled upward vertically toward the roof of the motor vehicle in order to delimit the luggage compartment from the rear of the motor vehicle.

In one advantageous embodiment of the invention, a locking device is provided that is movable transversely with respect to the bearing axis and secures the side part positively. This is an especially compact design since the locking and unlocking movement proceeds transversely with respect to the bearing axis and hence no space for installation need be provided in the axial direction.

In another advantageous embodiment of the invention, the bearing shaft for a self-centering device is mounted in an axially floating manner relative to both side parts. This ensures that the flat structure is always aligned centrally with respect to the luggage compartment even if only one of the two side parts is equipped with a lock.

In another advantageous embodiment of the invention, one side part is connected rigidly with a rod element that passes coaxially through the bearing shaft which is designed as a hollow shaft. The rod element has at its free end in the vicinity of the opposite side part a locking section by which a locking slide, mounted to be displaceable transversely with respect to the bearing axis in the side part, is brought positively into an effective connection. This type of locking device requires almost no additional axial space for installation, so that the luggage compartment cover can receive a relatively broad flat structure that nearly completely covers the luggage compartment. In addition, this design constitutes a lock that is simple to manufacture.

In another advantageous embodiment of the invention, at least one side part has associated with it as a lock a locking device that locks the side part axially with respect to the bearing shaft, said locking device being unlockable by means of a manually operable actuating button.

In another advantageous embodiment of the invention, the locking device has a locking element loaded by a spring device which is pressable in the release position of the luggage compartment cover automatically by the compressive force of the spring arrangement into a position in which it locks the side part. As a result, automatic locking of the side part takes place when the release position is reached.

In another advantageous embodiment of the invention, the locking element is part of the actuating button. In this case the actuating button has a dual function. It serves for both unlocking and locking of the side part.

In another advantageous embodiment of the invention, a locking arrangement that operates similar to a ballpoint pen is provided as a lock for the side part. This design according to the invention also permits locking the side part in a release position in which the luggage compartment cover has a lesser width than the spacing of the opposite mounts integral with the vehicle from one another, so that no major axial forces need be applied by hand in order to insert the luggage compartment cover into the corresponding mounts integral with the vehicle.

These and other objects, features and advantages of the present invention will become more readily apparent from the following detailed description when taken in conjunction with the accompanying drawings.

BRIEF DESCRIPTION OF THE DRAWINGS

FIG. 2 shows in a partially cutaway view the luggage compartment cover according to FIG. 1 in its release position, in which it has a width that is reduced relative to the locking position;

FIG. 3 shows the luggage compartment cover according to FIG. 2 in an intermediate position in which the lock is unlocked; and FIG. 4 is another view of the luggage compartment cover according to FIG. 2 in a locking position in which the luggage compartment cover is locked in the mounts integral with the vehicle;

FIG. 8 shows a lengthwise section through the luggage compartment cover according to FIG. 6;

FIG. 9 shows the luggage compartment cover according to FIG. 8 in a corresponding section but with the luggage compartment cover in its locking position;

DETAILED DESCRIPTION OF THE DRAWINGS

Figure 1:
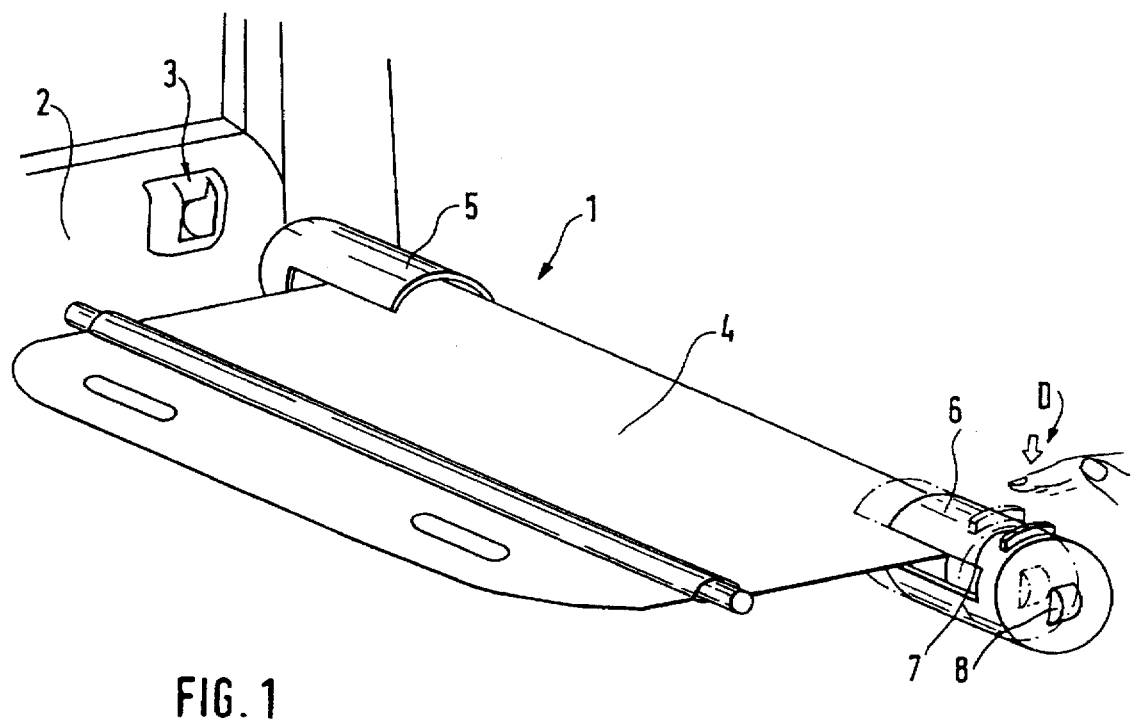
FIG. 1 shows a perspective view of one embodiment of a luggage compartment cover according to the present invention in which the surface structure that can be rolled up on a bearing shaft is flanked directly by side parts.

A luggage compartment cover (1) according to FIGS. 1 to 5b serves to cover a luggage compartment in a hatchback automobile. The luggage compartment cover (1) is mountable integral with the vehicle at opposite side walls (2) of the luggage compartment in conjunction with the backrests (not shown) of the rear seats of the hatchback automobile. For this purpose, on each side wall (2) a mount (3) integral with the vehicle is provided. The luggage compartment cover (1) has a concealing cover (4) that constitutes a surface structure that is mounted on a hollow shaft (10) that serves as a bearing shaft and can be rolled and unrolled around a bearing axis (9). Bearing axis (9) constitutes the central lengthwise axis of the luggage compartment cover (1).

Hollow shaft (10) is rotatably mounted at its opposite ends on bearing pins (14 and 16) of two side parts (5 and 6), which are made bucket-shaped and coaxially fit over the opposite ends of hollow shaft (10). The closed end of each side part (5, 6) forms the respective end of the luggage compartment cover (1). A locking cam (8) is provided at the outside of each closed end, said cam, in the locking position of the luggage compartment cover (1), engaging the respective mount (3) integral with the vehicle. Each side part (5, 6) has, in the vicinity of concealing cover (4), a lengthwise slot so that the movement of concealing cover (4) is not impeded by side parts (5 and 6). In the vicinity of the two ends of hollow shaft (10), a bucket-shaped bearing bushing (12 or 15) is provided inserted into the interior of the hollow shaft and rigidly connected therewith. The inside diameter of the bearing bushings (12, 15) is adapted to the respective outside diameter of the bearing pins (14, 16) of side parts (5, 6) so that a slide bearing is produced for the hollow shaft (10) on bearing pins (14, 16) of side parts (5, 6).

The two opposite side parts (5, 6) are nonrotatably connected with one another by a rod element (17) that passes through hollow shaft (10) coaxially with respect to bearing axis (9). Rod element (17) is connected rigidly by a pin (18) with side part (5), provided at the level of locking cam (8) of side part (5). Rod element (17) is therefore connected both in rotationally fixed fashion and in axially fixed fashion. Rod element (17) is connected only in rotationally fixed fashion with the opposite side part (6), but in the axial direction, relative to bearing axis (9), linear relative movements between the side part (6) and rod element (17), which has a round cross-section, are possible. For this purpose, a key pin (19) is provided in the vicinity of the free end of rod element (17), with which pin in side part (6), and in bearing pin (16) and locking cam (8) molded in one piece, a corresponding key cavity is associated. The key cavity is open toward the end of locking cam (8). The key cavity has a circular-cylindrical shape provided on two opposite sides, the top and bottom in the embodiment shown, each with a lengthwise groove. The key cavity and the shape of rod element (17) at the level of key pin (19) can be seen in FIGS. 5a and 5b. This guiding of rod element (17) in a groove connects side part (6) in rotationally fixed fashion with rod element (17), but at the same time axial relative movements between side part (6) and rod element (17) are possible.

Hollow shaft (10) is tensioned by a return spring (11) which pulls concealing cover (4) automatically into its rolled-up resting position. Return spring (11) engages bearing bushing (12) of hollow shaft (10) on the one hand and rod element (17) on the other hand in a manner not shown. Locking cams (8) are designed so that side parts (5, 6) cannot twist in mounts (3) integral with the vehicle.

Both side parts (5 and 6) are axially movable relative to hollow shaft (10), since bearing pins (14 and 16) are slid in a slidable and rotationally movable fashion into bearing bushings (12 and 15) of hollow shaft (10). Compression springs (13) are disposed between the bearing pins (14, 16) and the corresponding closed ends of the respective bearing bushings (12, 15). The two compression springs (13) are made identical so that they exert the same spring force. As a result, hollow shaft (10) is mounted to float relative to side parts (5 and 6) and is always aligned centrally with respect thereto. This is advantageous for the position of concealing cover (4), since concealing cover (4), because of this floating mount of the hollow shaft, is always aligned symmetrically with respect to the center of the luggage compartment. Hollow shaft (10) and also concealing cover (4) are always aligned centrally so that the fact that only side part (6) is arranged axially movably with respect to rod element (17) is not disadvantageous. The axial travel of side part (6) relative to rod element (17) outward is limited by a stop (21) which is provided in the key profile of bearing pin (16). In a locking position of luggage compartment cover (1) (FIG. 4), in which the luggage compartment cover (1) assumes its maximum width, key pin (19) abuts stop (21) thus limiting further axial movement of side part (6) relative to rod element (17) outward.

Side part (6) is lockable in a release position with a lock to be described in greater detail below, with the release position constituting that position of side part (6) in which bearing pin (16) of side part (6) has been pushed up to its stop into bearing bushing (15) of hollow shaft (10). The stop is formed by the maximally compressed coil compression spring (13). In this position, key pin (19) fits behind a locking slide (7) that is pushed transversely with respect to bearing axis (9) into side part (6) and, by means of a key eye (22) to be described in greater detail below, fits around rod element (17) and bearing pin (16).

Locking slide (7) constitutes a plate-shaped component in which the key eye (22) is formed by an elongate hole whose width corresponds to the diameter of bearing pin (16). On its top, locking slide (7) has an actuating rib which, in the locked state of locking slide (7), projects upward from side part (6). The sides projecting inward from the rib are made parallel to one another. The rib is adjusted in terms of its width to the width of the slot in the side part (6), so that the sides of the rib together with the edges of the slot form linear guides for locking slide (7). Additional linear guide areas are produced by the parallel walls of the elongate hole and by a stable locking tab (23) which projects into key eye (22) and with which a corresponding slot is provided in bearing pin (16). With this design of key eye (22) and the stable locking tab (23), it is possible to grip behind lock pin (19) and thus suppress a relative movement between side part (6) and rod element (17).

Figure 5A:
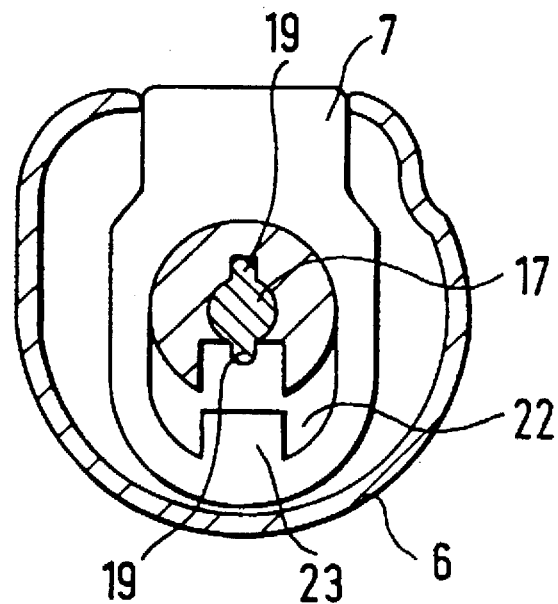
FIGS. 5a and 5b show a section through the luggage compartment cover along line V—V in FIG. 4.
Figure 5B:
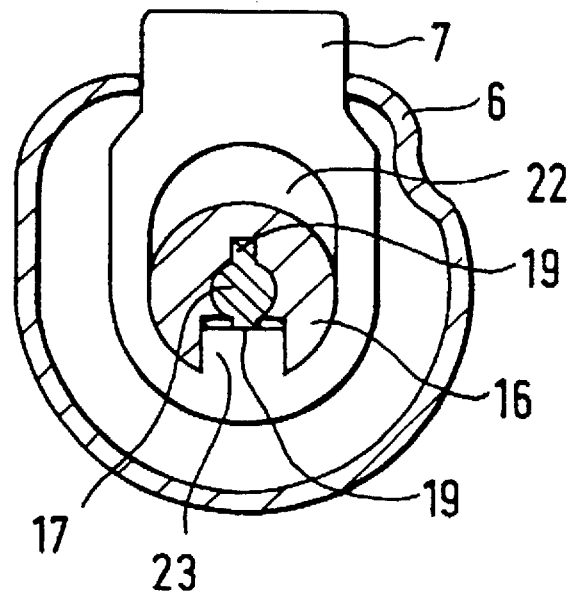
Figure 6:
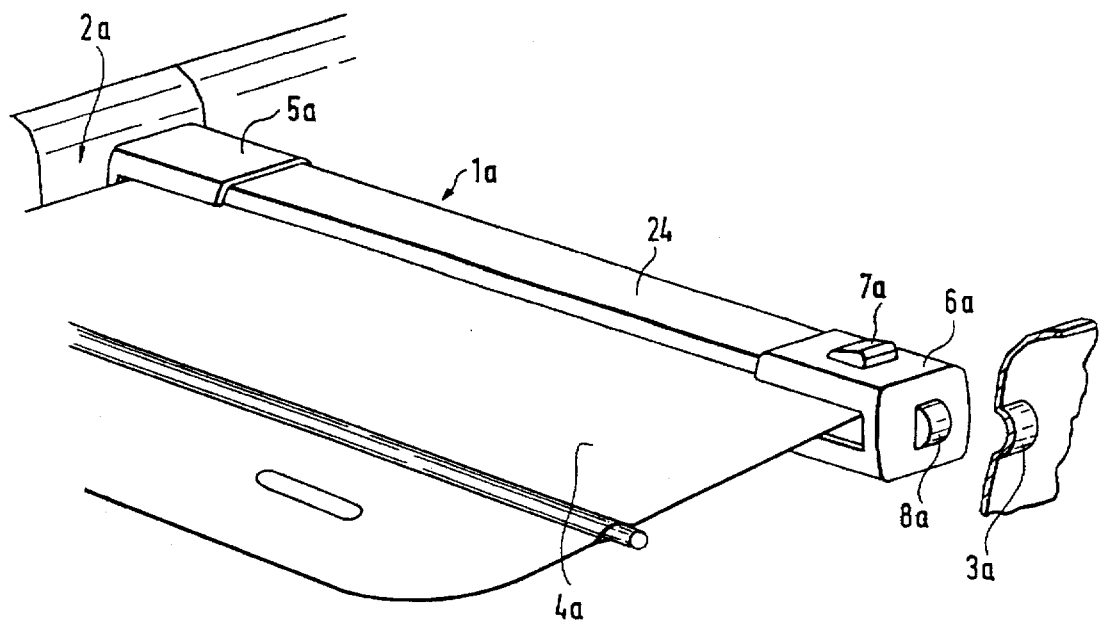
FIG. 6 is a perspective view of another embodiment of a luggage compartment cover according to the present invention provided with a cassette housing and shown in its release position.
Figure 7:
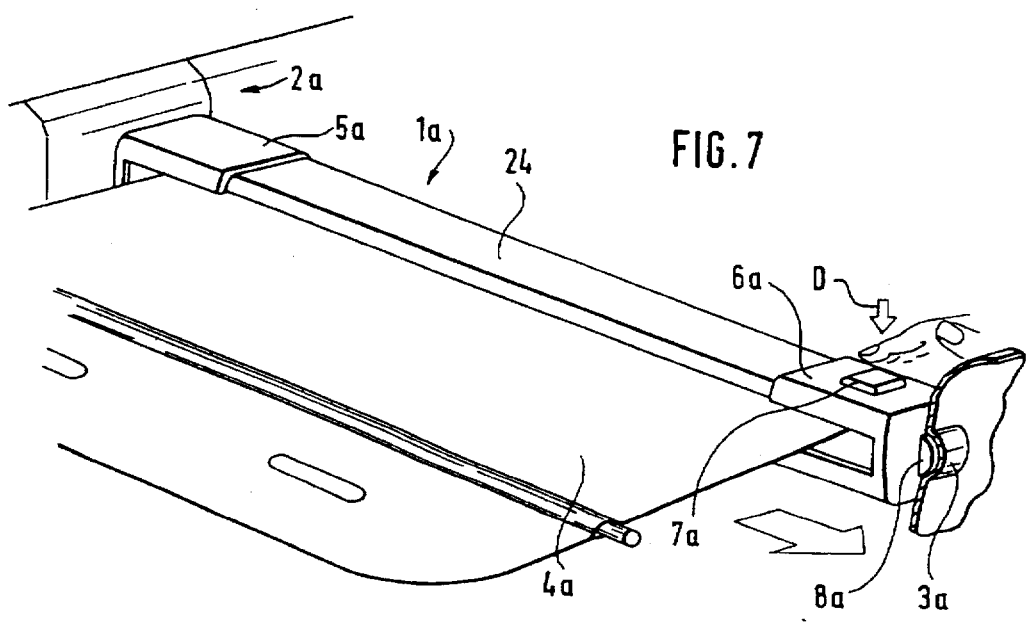
FIG. 7 shows the luggage compartment cover according to FIG. 6 in its locking position.

FIG. 5a shows the position of locking slide (7) which releases key pin (19) while FIG. 5b shows the position of locking slide (7) which engages key pin (19). On its underside, locking slide (7) has a compression spring (20) which pushes it back automatically into the operating position each time (FIG. 2). The position in which locking slide (7) engages key pin (19) constitutes the release position of side part (6) and hence of luggage compartment cover (1) in which the two side parts (6) are pushed axially onto hollow shaft (10) up to the stop. In this position, the luggage compartment cover (1), as shown by the hands shown schematically in FIG. 2, can be introduced into the luggage compartment without major expenditure of force and positioned at the level of mount (3) integral with the vehicle. This makes it possible for locking cam (8) of left side part (5) to be slid into the corresponding mount (3) integral with the vehicle. Then, in simple fashion, the actuating rib and with it locking slide (7) is pressed downward in the direction of the arrow (D) so that key pin (19) is released and side part (6) is forced outward by the compressive force of compression springs (13). Locking cam (8) is then slid into the corresponding mount (3) integral with the vehicle. As soon as the load imposed by the fingers of one hand on locking slide (7) is released, return spring (20) automatically returns locking slide (7) to its operating position as shown in FIG. 4. With the floating mount, hollow shaft (10) and hence concealing cover (4) will now have automatically aligned itself centrally with respect to the luggage compartment.

A luggage compartment cover (1a) as shown in FIGS. 6 to 9 likewise serves to cover a luggage compartment in a hatchback automobile. This luggage compartment cover (1a) is mounted integral with the vehicle on opposite side walls (2a) of the luggage compartment adjacent to the backrests of a rear seat of the automobile, not shown. For this purpose, mounts (3a) are provided which are integral with the vehicle in the side walls (2a). The luggage compartment cover (1a) in contrast to the luggage compartment cover (1) shown in FIGS. to 1 to 5b, has a cassette-type housing (24) provided with a slot at its front for concealing cover (4a) to emerge. The cassette-type housing (24) has a rectangular hollow profile.

On the cassette-shaped housing (24), in the vicinity of its opposite ends, the two side parts (5a, 6a) are slid on which essentially correspond to side parts (5 and 6) shown in FIGS. 1 to 4. Side parts (5a and 6a) however in accordance with the design of housing (24) are provided with a quadrangular bucket shape. In these side parts (5a and 6a) also, the closed ends of side parts (5a and 6a) simultaneously form the opposite ends of luggage compartment cover (1a). On the outsides of the closed ends, locking cams (8a) are provided on each side and are lockable in the corresponding mounts (3a) integral with the vehicle. Hollow shaft (10a), which supports concealing cover (4a), is also mounted so that it floats in accordance with the embodiment described above, with the aid of bearing pins (14a and 16a) and bearing bushings (12a and 15a) as well as compression springs (31) of equal size relative to the two side parts (5a and 6a). As shown in FIGS. 8 and 9, in luggage compartment cover (1a) according to FIGS. 6 to 9 however, the left side part (5a) is mounted rigidly to cassette housing (24) with the aid of rivets (25).

Right side part (6a) is displaceably mounted axially with respect to bearing axis (9a) on cassette housing (24) between a release position and a locking position. The two position stops which define the release position and the locking position of side part (6a) relative to cassette housing (24) are formed by a special design of a locking button (7a) which simultaneously serves as a lock for securing side part (6a) in its release position. Locking button (7a) is part of a locking device which constitutes the lock for side part (6a). The function of locking side part (6a) in its release position corresponds to the above-described function of the embodiment according to FIGS. 1 to 5b, so that this function is not discussed in any further detail here. Side part (6a) is positively held in its release position by the locking device, and hence also in the release position of luggage compartment cover (1a). In embodiments of the invention not shown, positive locking of the side part by jamming or the like is performed.

Locking button (7a) is inserted into two mutually flush and identically dimensioned openings in the top of luggage compartment cover (1a). A lower opening (29) is provided in cassette housing (24) and an upper opening is provided in side part (6a). In the release position of the luggage compartment cover (1a), the two openings are flush with one another. Locking button (7a) simultaneously serves as an actuating button which is movable in the direction of the arrows as shown in FIGS. 8 and 9. Locking button (7a) is mounted on a rib not shown in greater detail. The rib passes through the opening in the side part (6a) and is rigidly connected with side part (6a). Between the rib and locking button (7a), a compression spring (26) is provided that is compressible transversely with respect to bearing axis (9a). Locking button (7a) is compressible radially inward against the spring force of this compression spring (26) and is thus forced radially outward without an external load by the spring force of compression spring (26).

In both the side area of the sleeve-like cassette housing (24) and in the jacket of the bucket-shaped side part (6a), on an upper side of luggage compartment cover (1a) a square opening (29) is provided that matches the contour of locking button (7a). The dimensions of the holes match one another. Since the holes in the release position of luggage compartment cover (1a) overlap in a flush manner, locking button (7a) is automatically pressed radially upward in the direction of the arrow through the two holes (29) by the spring force of spring (26). The locking button has a vertical rib extension (28) which, in the position of locking button (7a) in which it is pressed outward, secures side part (6a) on cassette housing (24). The outside of the rib projection (28) therefore constitutes a position stop for the release position of side part (6a). The height of locking button (7a) is dimensioned so that in this position it projects upward through both holes out of side part (6a). Locking button (7a) is also provided with a horizontal lengthwise slot (27) which is open facing the end of side part (6a). Lengthwise slot (27) runs parallel to the circumferential walls of side part (6a) and cassette housing (24) and is open in the circumferential direction of luggage compartment cover (1a) on both sides. Locking button (7a) therefore, corresponding to the lengthwise section shown, has a profile that resembles the letter U or C. The height of the lengthwise slot (27) is adapted to the thickness of the wall of cassette housing (24) in such fashion that locking button (7a) can slide axially outward beyond the cassette sleeve (FIG. 9). The depth of lengthwise slot (27) in the axial direction also corresponds to the length of the maximum displacement travel of side part (6a) relative to cassette housing (24). The inside (30) of rib projection (28) thus constitutes the position stop for the locking position of luggage compartment cover (1a) (FIG. 9).

As soon as locking button (7a) has been pressed downward by actuation with the hand in the direction of the arrow (FIG. 9), to the point where lengthwise slot (27) is axially flush with the wall of cassette housing (24), side part (6a) is displaced automatically axially outward by the spring forces of compression springs (31). In order to bring the luggage compartment cover (1a) back into the release position in which it is locked by locking button (7a), the side part (6a, FIG. 8) is pressed in simple fashion by hand in the direction of the arrow, axially inward, until the two holes in side part (6a) and in cassette housing (24) are once again flush with one another. Under the spring force of compression springs (26), locking button (7a) is pressed radially outward automatically in this position in the direction of the arrow, so that side part (6a) is locked in this position again relative to cassette housing (24).

Figure 10:
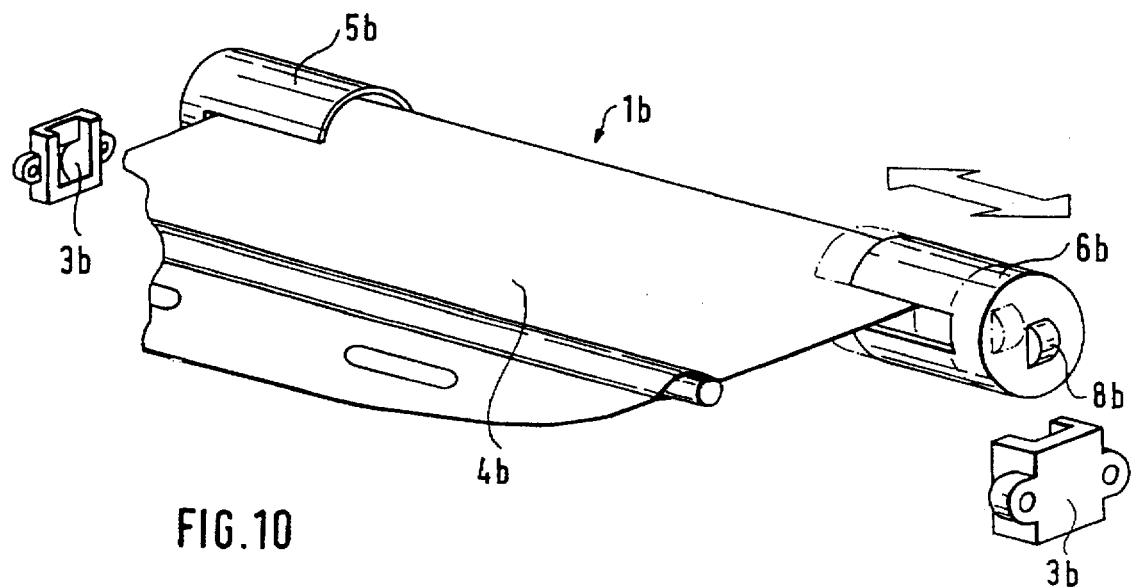
FIG. 10 is a perspective view of another embodiment of a luggage compartment cover according to the present invention in which the side part is lockable by means of a locking arrangement that acts similar to a ballpoint pen.
Figure 11:
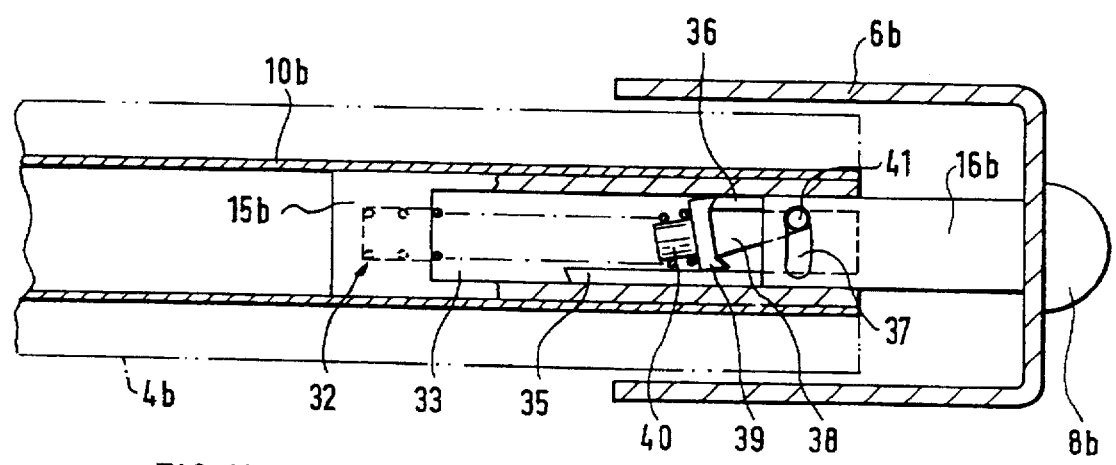
FIG. 11 is a lengthwise section through the luggage compartment cover according to FIG. 10 in the vicinity of the side part provided with the locking arrangement.

Another luggage compartment cover (1b) according to FIGS. 10 and 11 likewise has a hollow shaft (10b) which is gripped at its opposite ends each by a bucket-shaped side part (5b, 6b). Hollow shaft (10b) in this embodiment is not mounted so that it floats, so that left side part (5b) is connected in an axially fixed manner with hollow shaft (10b). The right part (6b), as shown in FIG. 10, is axially displaceable relative to hollow shaft (10b) between a release position and a locking position, with side part (6b), in correspondence with the embodiments described above, additionally being lockable in its release position. A locking device that operates like a ballpoint pen is provided as a lock for securing side part (6a) in the release position. For this purpose, in the bearing pin (16b) of side part (6b) guided in a bearing bushing (15b) of hollow shaft (10b), a curved groove (37) is provided in which a pin (41) is held that can be tilted into an axis that is perpendicular to the bearing axis in a cavity (33) of bearing bushing (15b). Locking head (38) has a locking ring (39) provided on its outer circumference with a locking nose that projects axially in the direction of bearing pin (16b). A cylindrical receiving area (40) to hold a coil spring (33) designed as a compression spring abuts locking ring (39) axially inward, the other end of said spring abutting a depression at a closed end of bearing bushing (15b). On two opposite sides, two locking ribs (35 and 36) project axially into the cavity of bearing bushing (15b), said ribs each abutting and fixed to the inside wall of bearing bushing (15b) with respect to which bearing pin (16b), slidably movable. Locking rib (36) has an axial length considerably reduced with respect to locking rib (35). The difference in the lengths of the two locking ribs (35 and 36) with respect to one another defines the maximum travel of side part (6b) between its release position and its locking position. Locking ribs (35 and 36) thus define the end stops for the two end positions as well. In accordance with the ballpoint pen principle, locking ring (39) engages either short locking rib (36) or long locking rib (35), so that side part (6b) is lockable in two different positions relative to hollow shaft (10b). The position shown constitutes the release position of luggage compartment cover (1b). As shown in FIG. 10, the mounts (3b) that are integral with the body of the vehicle are designed as retaining blocks that are rigidly connectable with the side walls of the luggage compartment.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A luggage compartment cover for a motor vehicle, having a bearing shaft extending between two bucket-shaped side parts for a flat structure that can be rolled and unrolled, at least one of the two side parts being mounted under spring tension and being movable coaxially with respect to a bearing axis of the bearing shaft between a first position stop and a second position stop, said first position stop defining a release position in which said at least one of the two side parts is released from a mount which is integral with the vehicle, and said second position stop defining a locking position in which said at least one of the two side parts is locked in said mount which is integral with the vehicle, wherein at least one side part has a corresponding releasable lock for locking said at least one side part in said first position stop which defines the release position.

2. A luggage compartment cover according to claim 1, wherein said releasable lock is movable transversely with respect to said bearing axis and positively locks side part in said release position.

3. A luggage compartment cover according to claim 2, wherein said bearing shaft is mounted in an axially floating manner for self-centering alignment relative to the two side parts.

4. A luggage compartment cover according to claim 1, wherein a first of said two side parts is connected rigidly with a rod element that coaxially traverses the bearing shaft which is designed as a hollow shaft, said rod element having a locking section at a free end in the vicinity of a second of said two side parts, said releasable lock being constructed as a locking slide which is mounted in said second side part to be displaceable transversely with respect to said bearing axis and being positively movable into a locking connection position engaging the locking section.

5. A luggage compartment cover according to claim 3, wherein a first of said two side parts is connected rigidly with a rod element that coaxially traverses the bearing shaft which is designed as a hollow shaft, said rod element having a locking section at a free end in the vicinity of a second of said two side parts, said releasable lock being constructed as a locking slide which is mounted in said second side part to be displaceable transversely with respect to said bearing axis and being positively movable into a locking connection position engaging the locking section.

6. A luggage compartment cover according to claim 5, wherein said locking slide projects radially outward from said second side part for manual operation and is provided with a return spring that returns it to said locking connection position.

7. A luggage compartment cover according to claim 6, wherein said rod element, in the vicinity of said locking section, is provided with a locking pin that projects radially outward on at least one side, and wherein the locking slide is provided with a key profile which corresponds to said locking pin.

8. A luggage compartment cover according to claim 1, wherein said releasable lock is configured to lock said at least one of the side parts axially relative to bearing shaft.

9. A luggage compartment cover according to claim 3, wherein said releasable lock is configured to lock said at least one of the side parts axially relative to bearing shaft, said releasable lock serving as actuating button for unlocking said releasable lock.

10. A luggage compartment cover according to claim 8, wherein said releasable lock is tensioned by a spring arrangement, said releasable lock being automatically pressed, in the release position of luggage compartment cover, by the compressive force of spring arrangement into a position in which said releasable lock fixes said side part with respect to said bearing shaft.

11. A luggage compartment cover according to claim 1, wherein said releasable lock comprises a locking member which is coupled to a bearing pin connected to said at least one side part, said locking member being selectively movable with respect to and engageable with fixed first and second locking ribs which respectively correspond to said first and said second position stops.

12. A luggage compartment cover according to claim 11, wherein said locking member is coupled to said bearing pin by a locking pin which is disposed in a groove in said bearing pin.

13. A luggage compartment cover according to claim 12, wherein said locking member further comprises a locking ring which is selectively engageable with said first and second locking ribs.

* * * * *